Feb. 12, 1929.
L. D. MILLS ET AL
1,701,818
PROCESS OF RECOVERING CYANIDE FROM SOLUTIONS
Filed Aug. 19, 1924   3 Sheets-Sheet 1
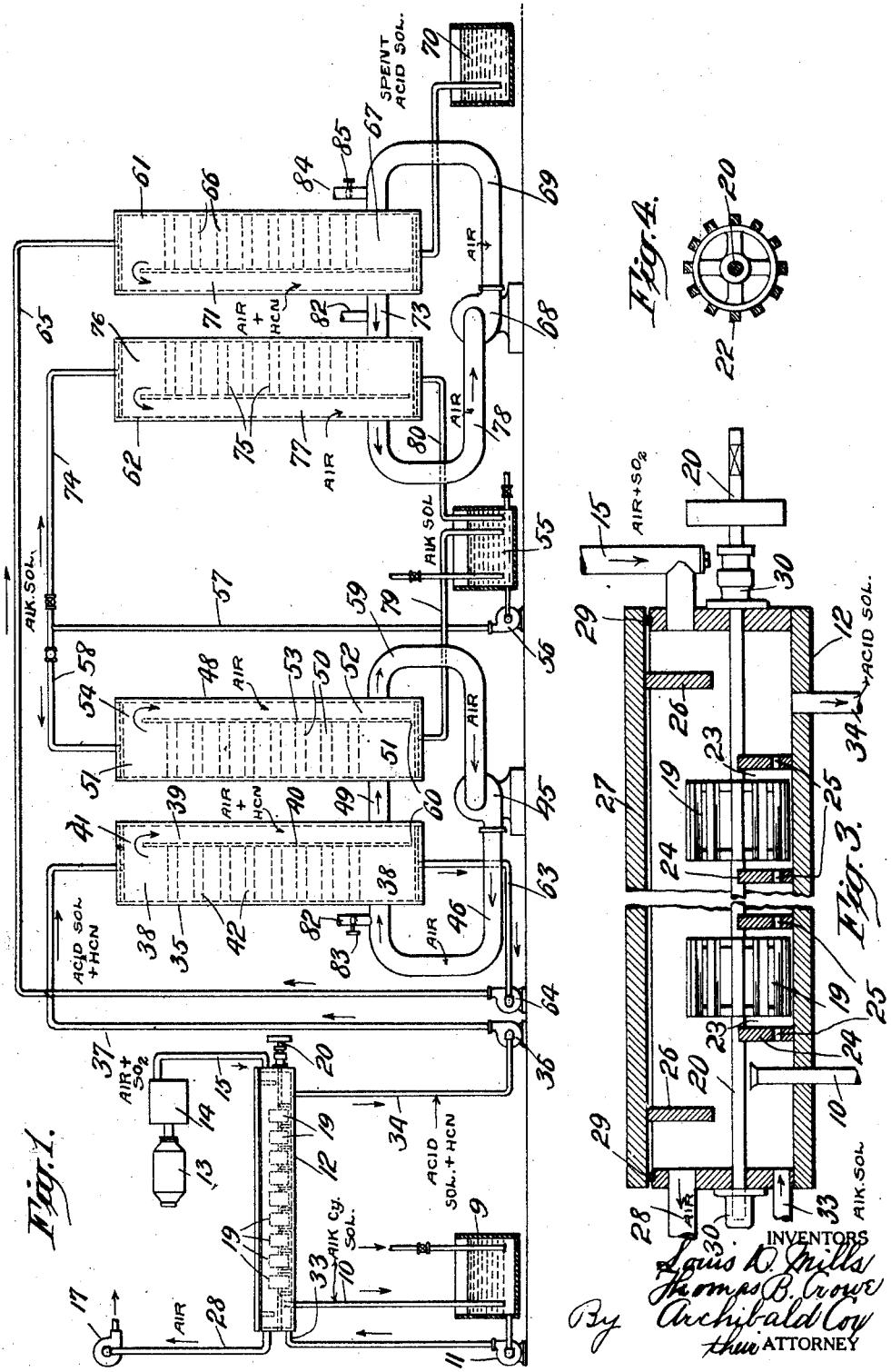

Feb. 12, 1929.   1,701,818
L. D. MILLS ET AL
PROCESS OF RECOVERING CYANIDE FROM SOLUTIONS
Filed Aug. 19, 1924   3 Sheets-Sheet 2
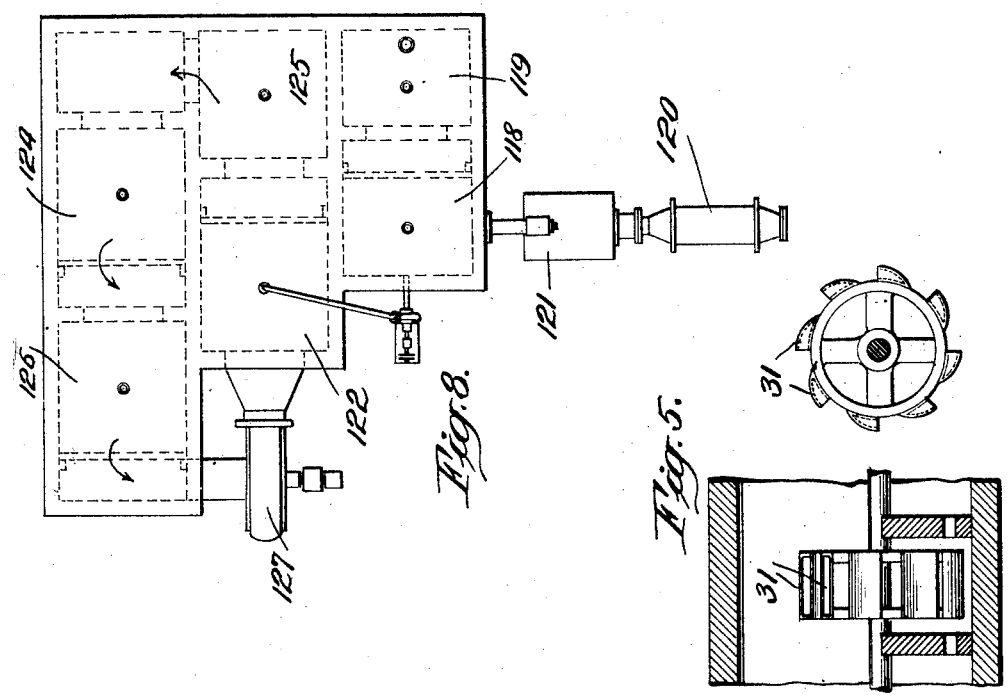
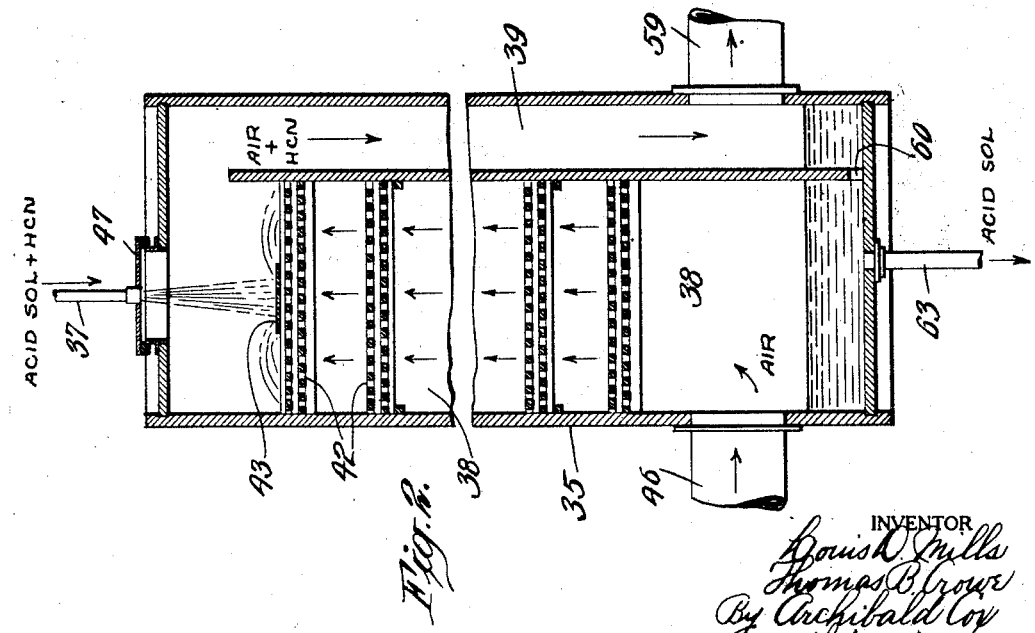
INVENTOR
Louis D. Mills
Thomas B. Crowe
By Archibald Cox
their ATTORNEY

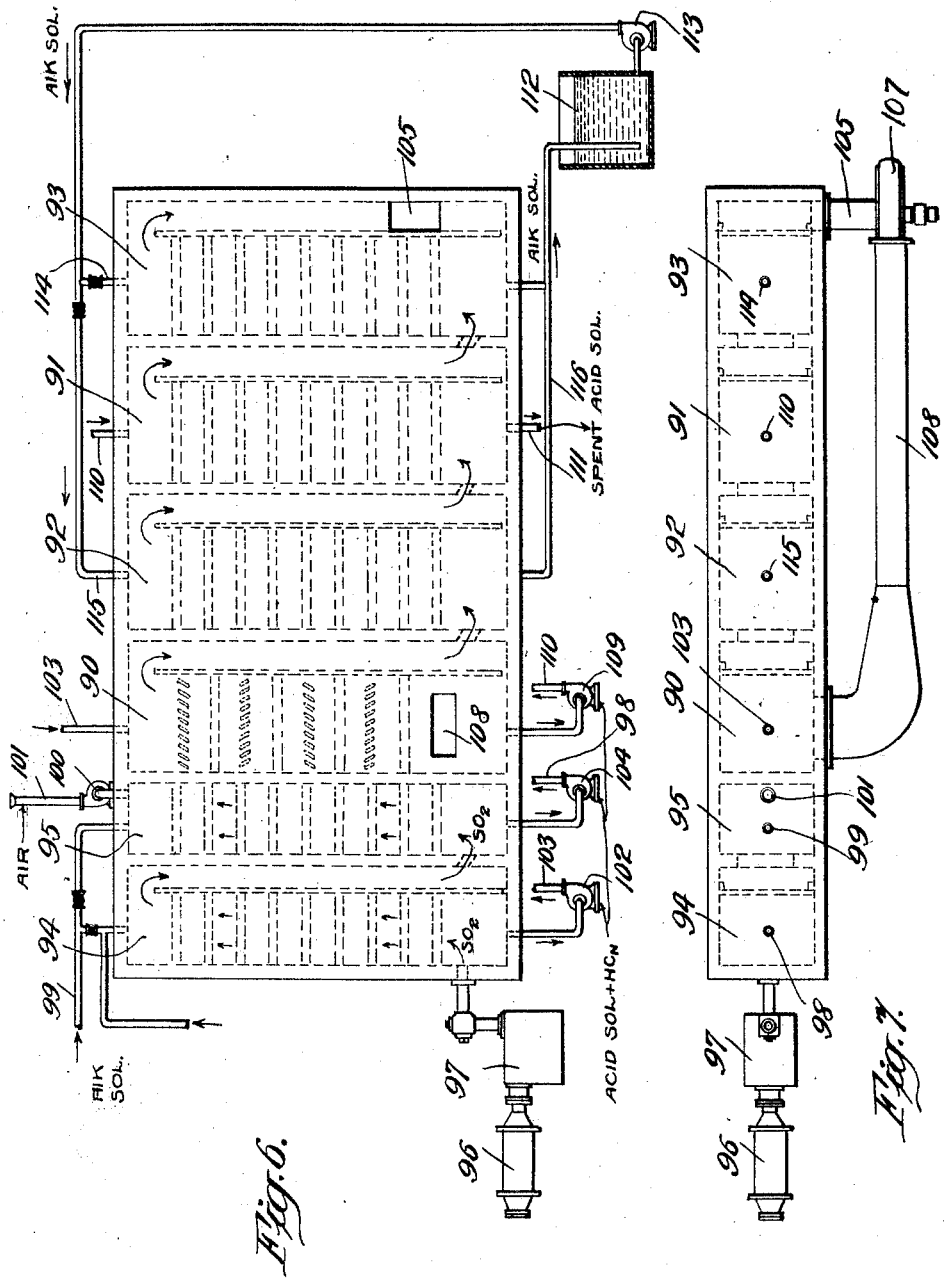

Patented Feb. 12, 1929.

1,701,818

UNITED STATES PATENT OFFICE.

LOUIS D. MILLS AND THOMAS B. CROWE, OF PALO ALTO, CALIFORNIA, ASSIGNORS TO THE MERRILL COMPANY, OF SAN FRANCISCO, CALIFORNIA, A CORPORATION OF CALIFORNIA.

PROCESS OF RECOVERING CYANIDE FROM SOLUTIONS.

Application filed August 19, 1924. Serial No. 732,890.

The invention relates to a process of recovering cyanide from solutions containing cyanogen compounds, and is more particularly concerned with the recovery and reuse of the cyanide used in cyaniding processes.

In cyaniding processes, as formerly practiced and as commonly practiced at the present time, there is a loss of much cyanide, with the result that cyaniding is expensive and practically limited to the recovery of the precious metals. It has been proposed to reduce the cost of cyaniding by recovering the cyanide of the alkali solution in which the metals have been dissolved, and so treating it as to render it available for further use.

Up to the present time, however, no commercially successful process has been put into operation. These prior processes, some of which have been patented, have proven defective in one or another of several particulars. One serious drawback to the successful exploitation of these processes is the fact that they require apparatus which is relatively expensive to construct and maintain in operation. That is, the cost of the apparatus and the cost of its operation more than balance the saving of cyanide. An even more serious drawback to the practical use of these prior processes is the fact that all of them, prior to our Patent 1,387,289, dated Aug. 9, 1921, have operated under pressure so that if the apparatus leaked even slightly, the fumes of escaping hydrogen cyanide gas proved fatal to the operatives. To overcome the deleterious effects of operating under pressure it was proposed in our said patent to operate under partial vacuum, but that process proved unsuccessful commercially, because the nature of the process required so much time for the removal or dispersion of the hydrogen cyanide from the solution (since only a relatively small volume of air could be drawn through the solution without excessive power consumption) that the apparatus required for practicing it was prohibitively expensive. As a result of these defects in the prior processes no successful process is in use today, except the present one, for recovering cyanide from the solutions used in the cyaniding processes for the treatment of gold and silver.

The object of the present invention is to produce an improved process of recovering cyanide from solutions so as to reduce the cost of recovering the cyanide, render the recovery more positive and efficient, eliminate the possibility of danger from escaping gas, and thereby simplify and cheapen the cyaniding process and extend its application to the treatment of the less precious ores.

In practicing the invention the solution from which the cyanide is to be recovered is first acidified. Sulphuric or other acid may be employed for this purpose and mixed with the solution. Preferably, however, the solution is subjected to a current of sulphur dioxide ($SO_2$). To facilitate the acidification of the solution it is finely divided and in that state the stream of sulphur dioxide is passed through it.

The acidified solution is then finely divided and a relatively large volume of air is passed through it to take up the hydrocyanic acid or hydrogen cyanide gas.

In extracting the hydrogen cyanide from the acidified solution the volume of air used will be so large that the concentration of hydrogen cyanide in the mixture will be relatively low and therefore the mixture of hydrogen cyanide and air will have no deleterious effects upon the workmen if breathed for a short period of time. Furthermore, since the proportion of hydrogen cyanide to the volume of air is relatively small, there is a very rapid dispersion of the hydrogen cyanide from the acidified solution into the air. And since the operation is carried out under slightly reduced pressure, the apparatus can be constructed of cheaper and lighter materials than would be necessary if an absolutely tight equipment were required.

The hydrogen cyanide gas removed from the acidified solution may be absorbed in any suitable alkaline solution. This step of the process is preferably carried out by finely dividing the alkaline solution and passing the hydrogen cyanide laden air through the finely divided solution. By this means there is a rapid and intimate contact between the hydrogen cyanide and the alkaline solution so that the latter effectively absorbs the gas and converts it into an alkali cyanide.

In the preferred form of the invention the finely divided acidified solution is flowed in one direction and the relatively large volume of air is passed through it in the opposite direction. So also the finely divided alkaline solution is flowed in one direction and the air carrying the hydrogen cyanide gas passes through it in the opposite direction. This method of treatment, by assuring a rapid and intimate contact between the air and the acidified solution in the first instance and between the air and gas and the alkaline solution in the second instance, conduces greatly to the commercial success of the process. By properly proportioning the areas of the dispersing vessel and of the absorbing vessel and the area of the piping and reducing the amount of piping required to a minimum, the whole process may be practiced with a power consumption of less than one horse power hour per ton of solution treated. The process may be carried out with one dispersing vessel and with one absorbing vessel but it is preferred to use two dispersers and two absorbers in series so as to assure complete recovery of the hydrogen cyanide from the acidified solution and its complete absorption in the alkaline solution.

The current of air into which the hydrogen cyanide is dispersed and which carries the hydrogen cyanide into contact with the alkaline solution is preferably flowed in a closed circuit. The current of air—produced or induced by a fan—first passes through the dispersing vessel, then through the absorbing vessel and is again returned by the fan to the dispersing vessel. Means are provided in the circuit for regulating the pressures in the various parts of the system.

In the accompanying drawings illustrating apparatus for use in practicing the improved process of recovering cyanide from solutions of cyanogen compounds, Fig. 1 is a diagrammatic view of the preferred form of apparatus; Fig. 2 is a vertical section through one of the dispersers shown in Fig. 1; Fig. 3 is an enlarged longitudinal section (with the middle portion broken away) of the receptacle in which the cyanide containing solution is acidified; Fig. 4 is an end elevation of one of the rotors for finely dividing the solution to be acidified; Fig. 5 is an end and side elevation of a modified form of rotor; Fig. 6 is a diagrammatic view of a modified form of apparatus; Fig. 7 is a plan of the apparatus shown in Fig. 6; and Fig. 8 is a plan of a second modified form of apparatus.

The solution containing the cyanogen compounds from which cyanide is to be recovered or transposed is contained in a tank 9 from which it is transferred by the pump 11 to an elongated, rectangular receptacle or chamber 12 in which it is acidified. The solution in the chamber 12 is kept at substantially a constant level so as to provide a space in the upper part of the chamber for the passage of the acidifying gas therethrough, any excess solution returning to the tank 9 through the overflow pipe 10. The acidification of the cyanide containing solution is conveniently effected by burning sulphur in the burner 13 and combustion chamber 14 and passing the sulphur dioxide ($SO_2$), and any sulphur trioxide ($SO_3$) which may be present, through the chamber 12 which is connected with the combustion chamber by the pipe 15. The pump 17 serves to draw the sulphur dioxide through the acidifying chamber 12, the air depleted of the sulphur dioxide being discharged into the atmosphere.

In order that there may be a speedy and effective mixture of the solution and the sulphur dioxide, the solution in the chamber 12 is finely divided or broken up into small particles by a series of rotors 19 mounted on a shaft 20 which may be driven from any convenient source of power. The peripheries of the rotors 19 are provided with longitudinally arranged strips 22 which serve to agitate the solution violently and throw it up into the stream of gas passing through the upper part of the chamber. The action of the rotors is aided by dividing the chamber 12 into a series of compartments 23 separated by partitions 24, in each of which is located one of the rotors 19. The compartments 23 communicate with each other through apertures 25 in the partition walls 24. Baffles 26 depending from the cover 27 prevent the solution from being splashed into the inlet pipe 15 and outlet pipe 28. An air tight joint between the cover 27 and chamber 12 is provided by means of the gasket 29. The cover 27 is removable so as to provide ready access to the interior of the acidifying chamber to remove the deposit of calcium sulfite and sulfate formed during the acidification of the solution. Leakage around the shaft 20 is prevented by the specially constructed bearings 30. The modified form of rotor shown in Fig. 5 is provided with buckets 31 in place of the strips 22. The acidifying chamber 12 is of such length that as the solution passes therethrough from the inlet pipe 33 to the outlet pipe 34, substantially all the cyanogen of the cyanogen compounds contained in the solution is converted into hydrogen cyanide.

The solution containing the hydrogen cyanide, or acidified solution as it is termed, is conducted from the acidifying chamber 12 to a dispersing vessel or disperser 35 in which the hydrogen cyanide volatilizes and is dispersed into a current of air. The solution is introduced into the disperser 35 by means of the pump 36, the intake of which is connected with the pipe 34 and the discharge opening of which is connected by the pipe 37 with the upper end of the disperser 35. The disperser is divided vertically into two compartments 38 and 39 by a vertically arranged partition wall 40 which terminates below the top of the receptacle to provide an air passage 41. In the compartment 38 are located a series of grids 42 consisting of spaced strips crossed alternately and arranged horizontally, down through which the acidified solution trickles and by which it is divided into tenuous films and small drops or streams. The uppermost grid is provided with a baffle plate 43 (Fig. 2) by which the incoming stream of solution is spread laterally so that it will flow down over the entire area of the grids.

During the downward flow of the acidified solution through the grids 42 a relatively large volume of air is caused to flow upwardly through the chamber 38 so as to take up the hydrogen cyanide from the solution. For this purpose a fan 45 is used, the discharge opening of which is connected by the pipe 46 with the lower part of the chamber 38 at a point under the lowermost grid therein. By flowing the acidified solution broken up into tenuous streams and films through a relatively large volume of air flowing in counter-current to the solution, a rapid and almost complete dispersion of the hydrogen cyanide into the air is effected. Since the stream of solution and the stream of air are flowing counter-current to each other the amount of hydrogen cyanide in the air gradually increases as the air proceeds up through the tower and the amount of hydrogen cyanide in the solution gradually decreases as the solution travels downward through the tower. Thus the fresh air entering the bottom of the dispersion tower encounters solution from which nearly all the hydrogen cyanide has already been removed and therefore is effective in almost completely removing the remaining traces of hydrogen cyanide therefrom. The hydrogen cyanide laden air from the compartment 38 is conducted through the compartment or air duct 39 and introduced into the lower part of an absorber 48 through a pipe 49 which enters the absorber just below the lowermost of the series of grids 50 with which the absorber is provided.

The hydrogen cyanide gas in the air entering the absorber 48 is absorbed by an alkaline solution which is introduced into the top of the absorber and caused to trickle down through the grids 50 which are the same in construction and arrangement as the grids 42 of the disperser 35. The absorber 48 is divided into a compartment 51, in which the grids 50 are located, and an air duct 52 by the vertically arranged partition wall 53 which terminates below the upper end of the absorber to provide the air passage 54. The alkaline solution is introduced into the top of the absorber from a tank 55 by means of a pump 56 which is connected with the top of the absorber by the pipes 57 and 58. The lower end of the air duct 52 is connected by the pipe 59 with the intake of the fan 45.

The cross-sectional area of the duct 39 and of the duct 52 is larger than the area of the pipes 46 and 59 so that any solution which is drawn into the ducts by the air flow will be caught in the bottom of the ducts and returned to the bottom of the compartments 38 and 51 through the openings 60 in the bottoms of the partition walls 40 and 53.

The disperser 35 and absorber 48 will preferably be constructed so as to permit ready access to their interiors for inspection and cleaning of the grids, on the lowermost of which a deposit of calcium sulphite and calcium sulphate forms and must be removed occasionally. The top of the disperser and of the absorber is provided with a removable cover 47, the joint between the cover and the top of each receptacle being sealed by a gasket.

In case there is not complete dispersion of the hydrogen cyanide in the disperser 35 and complete absorption of the hydrogen cyanide in the absorber 48, a second disperser 61 and a second absorber 62 are arranged in series with the first disperser and the first absorber. The disperser 61 and absorber 62 are the same in construction and mode of operation as the disperser 35 and absorber 48. The acidified solution which has passed down through the grids 42 in the disperser 35 collects in the bottom of the compartment 38 and passes therefrom through the pipe 63 into the intake of the pump 64 by which it is forced through the pipe 65 into the upper end of the disperser 61, being split up and finely divided by the grids 66 in its passage downward through the compartment 67 in the disperser 61. The fan 68 connected by the pipe 69 with the lower end of the compartment 67 at a point beneath the lowermost of the grids 66 therein serves to pass air through the finely divided solution so as to take up therefrom any remaining hydrogen cyanide. From the compartment 67 the impoverished solution passes into the storage tank 70. The air carrying whatever hydrogen cyanide it removed from the solution in the compartment 67 passes through the air chamber or duct 71 and into the lower part of the absorber 62 by the connecting pipe 73. The alkali solution from the tank 55 is supplied to the absorber 62 through the pipe 57 and the pipe 74 connected with the upper end of the absorber 62. This alkali solution flowing downwardly through the grids 75 in the compartment 76 absorbs the hydrogen cyanide passing upwardly through the compartment. The impoverished air is drawn from the absorber through the duct 77 and the pipe 78 into the intake of the fan 68. The alkali solution which has passed through the absorbers 48 and 62 and taken up the hydrogen-cyanide from the air currents passing through the compartments 51 and 76 is returned to the tank 55 through the pipes 79 and 80.

The circulation of the air through the dispersers and absorbers by the fans 45 and 68, as described above, is in a closed circuit.

This arrangement has several advantages. The air pressure in the upper parts of the dispersers and the absorbers and in the piping on the suction side of the fans 45 and 68 is slightly below atmospheric pressure, and so there can be no leakage of the poisonous cyanogen gases. The pressure in the discharge pipes 46 and 69 and in the spaces below the grids in the dispersers is substantially atmospheric. By constantly reusing the same air there is no wasteful consumption of alkali which would result from the carbon dioxide contained in fresh air. In order that the air drawn into the circuits either from leaks in the apparatus, or brought in with the solution, or from the operation of air lifts (which may be substituted for pumps in conducting the solution to the various receptacles), may be vented to the atmosphere, the pipe 46 is provided with a small vent pipe 82 which discharges into the pipe 73 connecting the disperser 61 and the absorber 62. In the vent pipe 82 is a damper 83 for regulating the amount of air permitted to pass from the circuit of the fan 45 to the circuit of the fan 68. The pipe 69 is provided with a vent pipe 84 which opens to the atmosphere and is controlled by a damper 85. The surplus air of the combined circuits is discharged through the vent 84. Inasmuch as there is usually a recovery from 70% to 90% of the total hydrogen cyanide in the first disperser and first absorber there will be only traces of hydrogen cyanide in the air discharged through the vent 84, even if the recovery and absorption in the disperser 61 and absorber 62 are not complete.

For convenience the practice of the process in the preferred form of apparatus may be recapitulated as follows:—Sulphur is ignited in the burner 13 and the mixture of air and sulphur dioxide gas is drawn through the acidifying chamber 12 by the fan 17. The pump 11 and rotors 19 having been started in operation the solution containing the cyanogen compounds is thrown up as small particles into the stream of sulphur dioxide gas and the gas is thereby absorbed by the solution, converting the cyanogen in the cyanogen compounds into hydrogen cyanide which remains absorbed in the solution until the solution is introduced into the disperser 35 by the pump 36. While the acidified solution is trickling down through the grids in the disperser 35 a relatively large volume of air is drawn through the solution by the fan 45 so as to liberate the hydrogen cyanide gas therefrom. At the same time alkali solution from the tank 55 is caused to trickle down through the grids in the absorber 48 by the pump 56 so that as the hydrogen cyanide laden air from the disperser 35 passes upwardly through the grids in absorber 48, the alkali solution will absorb the hydrogen cyanide from the air and convert it into an alkali cyanide. The solution which has passed through the disperser 35 is further treated in the disperser 61 through which the fan 68 draws a current of air to remove whatever hydrogen cyanide still remains in the solution after its treatment in disperser 35. This air is then drawn through the absorber 62 to lose its hydrogen cyanide gas in the alkali solution fed through the absorber from the tank 55 by the pump 56. From time to time slaked lime or calcium hydrate is added to the solution in the tank 55 so as to maintain therein the required amount of alkali to combine with the absorbed hydrogen cyanide. The spent solution from the second disperser 61 flows into the storage tank 70 in which precipitated metal compounds may be recovered by filtration.

As illustrative of the operating results obtained from the use of the present process the following data are given:—A "barren" solution from a silver cyanide mill was treated, that is, a solution from which the silver had been precipitated and removed by means of zinc. One hundred tons of solution were treated during twenty-four hours. Each ton (2,000 lbs.) of solution contained 4.26 lbs. of free cyanide, (or 4.78 lbs. of cyanide in total) and 4.62 lbs. of alkali, the equivalent of lime ($CAO$). By burning and absorbing 2.64 lbs. of sulphur per ton of solution treated, the solution was rendered acid to methyl orange, the acidity being kept between .1 and .2 pounds of sulphurous acid ($H_2SO_3$) per ton of solution. On passing this solution through the apparatus 249 pounds of calcium cyanide or 73.6% of the hydrogen cyanide was recovered in the first absorber and 71 pounds calcium cyanide or 21% of hydrogen cyanide in the second absorber. The air circulated in each pair of dispersers and absorbers was 1020 cu. ft. per minute, or 10.2 cu. ft. of air per minute per ton of solution treated during the twenty-four hours. The lime consumed in forming the calcium cyanide was 2.45 pounds per ton of solution or 1.35 pounds per pound of cyanide.

By causing the current of air to flow in a closed circuit through the disperser and the absorber, rather than by continuously introducing fresh atmospheric air into the disperser and absorber, the introduction of carbon dioxide into the system is almost wholly prevented. Thus there is no waste of lime by absorption by carbon dioxide. In the illustration given above, approximately 15,000 cubic feet of free air was used in each circuit to remove or disperse the hydrogen cyanide from one ton of acidified solution. Since the normal carbon dioxide content of the atmosphere is .336 parts per thousand by volume, it will be understood that if fresh atmospheric air were introduced into the system 2.50 pounds of calcium carbonate ($CaCO_3$) would be formed from each ton of solution treated. Thus there would not only be a wasteful consumption of lime but also a deposition of the calcium carbonate on the grids of the absorbers which would obstruct the flow of air and solution therethrough thereby necessitating such frequent cleaning as to render the process impracticable. These figures are based on the normal carbon dioxide content of the air. It is well-known, however, that in arid regions the carbon dioxide content of the air is about three times greater than normal. And since many cyanide mill operations are carried on in arid regions the deposition of calcium carbonate would be about three times normal or about 7.50 pounds per ton of solution treated.

As will be understood from a consideration of the figures given above, the recovery of the cyanide which exists in the solution as a "free" cyanide or as a zinc double cyanide is substantially complete by means of the present process. Most of the cyanide present in working mill solutions exists in one or the other of these forms. Some mill solutions will occasionally contain appreciable amounts of cyanogen combined with silver or copper and as sulpho-cyanides and ferro-cyanides. On acidification the silver and copper cyanides in the absence of sulpho- and ferro-cyanides yield one-half of their cyanogen as hydrogen cyanide, the remainder being combined with the metals as an insoluble precipitate. Where chlorides are present in the solution the silver will yield all its cyanogen on acidification, the silver remaining in the form of silver chloride.

Where copper cyanide is present but no sulpho- and ferro-cyanides, the precipitate may be treated with hydrochloric acid or with sulphuric acid and common salt, preferably with heat, so that the cyanogen is given off and recovered as hydrogen cyanide and the copper remains as an acid salt from which we may recover the copper by precipitation on iron or electrolytically, which has the advantage of regenerating the acid for reuse.

The recovery of cyanide from sulpho- and ferro-cyanides presents considerably greater difficulties but under certain conditions, as for instance, when copper is also present in the solutions in sufficient amount, then a precipitate of copper ferro- and sulpho-cyanide may be recovered from the spent acid solution and this precipitate may be then treated in one of several ways, as for example, with sulphuric acid and an oxidizing agent for the recovery of the cyanide and copper.

In the modified form of apparatus shown in Figs. 6 and 7 the dispersers 90 and 91 and the absorbers 92 and 93 are arranged alternately and contiguously. Connected with the dispersers and absorbers is a pair of acidifying towers 94 and 95. The acidifiers and the dispersers and absorbers are provided with grids of the same construction and arrangement as the grids in the dispersers and absorbers shown in the preferred form of apparatus. A sulphur burner 96 and a combustion chamber 97 are connected with the acidifying tower 94. The air passing through the acidifiers 94 and 95 from which the sulphur dioxide has been absorbed by the solution supplied to the acidifiers by the pipes 98 and 99 is discharged into the atmosphere by the fan 100 and pipe 101. The acidified solution from the acidifying tower 94 is conducted to disperser 90 by the pump 102 and a pipe 103 which is connected with the upper end of disperser 90. The solution which has passed through the acidifying tower 95 is fed into the acidifying tower 94 for retreatment by the pump 104 and pipe 98, inasmuch as the air passing through the acidifying tower 95 has first passed through the tower 94 and lost much of its sulphur dioxide.

The hydrocyanic acid or hydrogen cyanide in the solution is dispersed into a current of air caused to flow upwardly through the grids in disperser 90 by a fan 107 connected by the pipe 108 with the disperser at a point just below the lowermost of the grids therein. This current of air returns to the intake of the fan 107 through the absorber 92, the disperser 91, the absorber 93 and the pipe 105 as indicated by the bent arrows in Fig. 6. The solution which is passed down through the disperser 90 is conducted by the pump 109 and pipe 110 to the disperser 91 from which it is conducted by the pipe 111 to a storage tank. The alkaline solution for absorbing the hydrogen cyanide is supplied to the absorbers 92 and 93 from a tank 112 by a pump 113 and the pipes 114 and 115. The alkali cyanide is conducted from the absorbers 92 and 93 to the tank 112 by the pipe 116.

The arrangement shown in Fig. 8 will be readily understood from the arrangement shown in Figs. 6 and 7. The sulphur dioxide is supplied to the acidifying towers 118 and 119 from the sulphur burner 120 and from the combustion chamber 121. The acidified solution is first subjected to the air current in the disperser 122 and then passes into a disperser 124 for further treatment. The current of air is circulated through the dispersers and the absorbers 125 and 126 by the fan 127, the curved arrows indicating the passage of the air current. Although only one air circuit is used in the arrangement of apparatus shown in Figs. 6 and 7 and Fig. 8, it will be understood that each dispersing and absorbing couple (consisting of one disperser and one absorber) may be provided with its own independent air circuit, as shown in the preferred form of apparatus.

Having thus described the invention, what we claim as new is:—

1. The process of recovering cyanide from solutions, which consists in acidifying the solution, maintaining a flow of the acidified solution and a separate flow of an alkali solution, and maintaining a flow of air in a closed circuit, first through the acidified solution and then through the alkali solution.

2. The process of recovering cyanide from solutions, which consists in acidifying the solution, flowing the acidified solution through a receptacle closed to the atmosphere, flowing an alkali solution through a second receptacle closed to the atmosphere and maintaining a flow of air through the first receptacle, then through the second receptacle, and back to the first reecptacle.

3. The process of recovering cyanide from solutions, which consists in acidifying the solution, maintaining a flow of the acidified solution and a separate flow of alkali solution, and flowing a current of air substantially free from carbon dioxide first through the acidified solution and then through the alkali solution.

4. The method of recovering cyanide from cyanide solutions which consists in acidifying the solution to form hydrocyanic acid, passing the acidified solution counter-currently and in intimate contact with a current of air to vaporize hydrocyanic acid from the solution, passing the mixture of hydrocyanic acid and air through an alkaline solution to absorb the hydrocyanic acid and form a cyanide, and continuously recirculating the air for contact with the acidified solution.

LOUIS D. MILLS.
THOMAS B. CROWE.